July 28, 1942.                    M. G. ROBINSON                    2,291,346
                              MOTOR DRIVEN FLUID PUMP
                               Filed Sept. 20, 1940
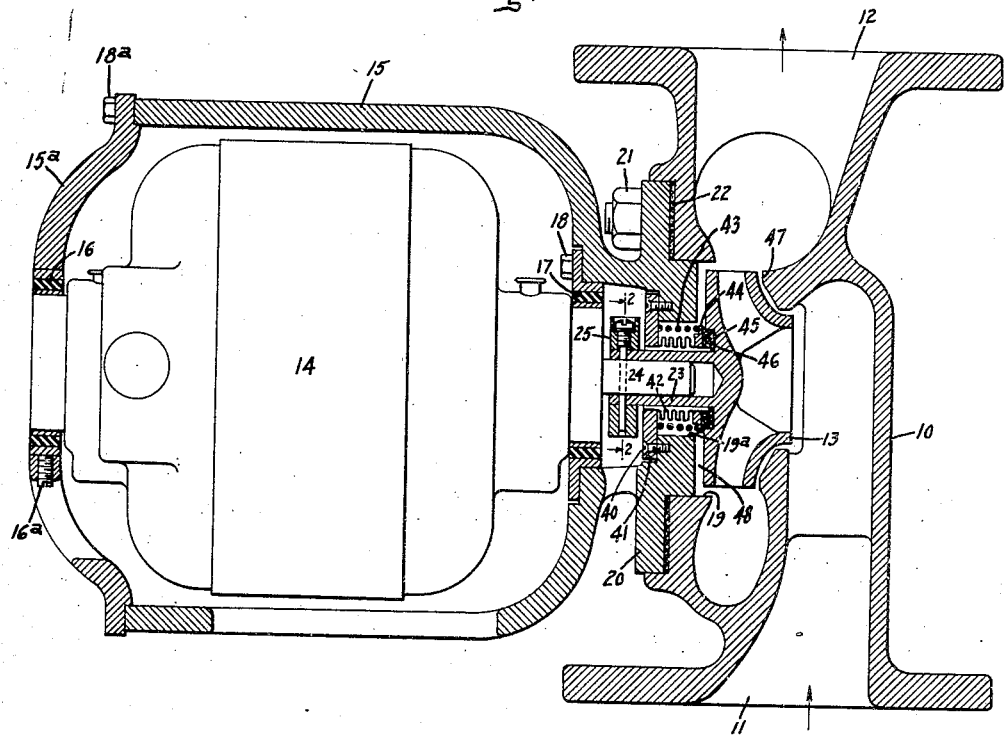
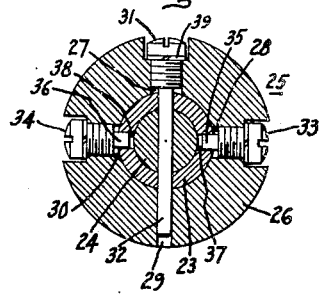
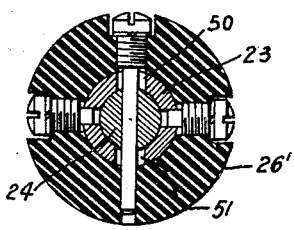
Inventor:
Manuel G. Robinson,
by Harry E. Dunham
His Attorney.

Patented July 28, 1942

2,291,346

UNITED STATES PATENT OFFICE 2,291,346

MOTOR DRIVEN FLUID PUMP

Manuel G. Robinson, Glen Ridge, N. J., assignor to General Electric Company, a corporation of New York Application September 20, 1940, Serial No. 357,593

1 Claim. (Cl. 103—87)

My invention relates to motor driven fluid pumps, and particularly to motor driven pumps of the type used to circulate fluid through a closed system such as a hot water heating system although it is not necessarily limited to this specific application.

One object of my invention is to provide an improved construction wherein the component parts of the motor driven pump may very easily and quickly be assembled and disassembled and the number of parts reduced to a minimum.

It is a further object of my invention to provide an improved construction wherein the motor and impeller sealing means may be removed without substantial loss of fluid from the system to which the pump is connected.

It is a further object of my invention to provide a pump construction having an improved flexible coupling means between the impeller and the motor shaft on which it is mounted.

It is a still further object of my invention to provide an improved construction and arrangement in a pump of this character wherein the necessity of separate bearings for the pump impeller is eliminated.

Further objects and advantages of my invention will become apparent as the following description proceeds and the features of novelty which characterize my invention will be pointed out with particularity in the claim annexed to and forming a part of this specification.

In the drawing Fig. 1 shows a sectional view of a motor driven pump illustrating my invention, Fig. 2 is a sectional view taken along the line 2—2 of Fig. 1 and Fig. 3 is a modification of the construction shown in Fig. 2.

Referring to the drawing, the pump 10 has an inlet passage 11 and an outlet passage 12 adapted to be connected to a system in which fluid is to be pumped. The pump impeller 13 is directly driven by a suitable motor 14 mounted in a motor support 15 on cushion rings 16 and 17 positioned in concentric cylindrical seats. The purpose of the cushion rings is to absorb motor vibrations and they may comprise a ring of resilient material, such as rubber, bound by concentric metal rings. The front cushion ring 17 is secured to the support 15 by suitable screw fastenings 18, only one of which is shown. The rear cushion ring 16 is carried by the end supporting member 15a which is secured to the frame member 15 by suitable screw fastenings, one of which is shown at 18a. A set screw 16a holds the ring 16 in the desired position in its cylindrical bearing seat.

The casing of the pump 10 is provided with an opening or aperture 19 which is closed by a plate member 20. In the illustrated preferred embodiment, the plate member 20 is shown as being formed as an integral part of the motor support 15. However, it will be understood that these parts may be made separate and fastened together by suitable fastening means. The plate member 20 is held in position, where it closes the aperture 19 by suitable screw fastenings, one of which is shown at 21. Preferably a gasket 22 is provided to secure a tight joint between the plate member and the pump casing.

The impeller 13 has a hub comprising a sleeve portion 23 which extends through the aperture 19a in the plate member 20 and receives in telescoping relation the projecting or overhung portion 24 of the motor drive shaft. The motor shaft 24 is coupled to the sleeve 23 by means of a coupling member 25, the details of construction of which are best shown in Figs. 2 and 3 of the drawing.

Referring to Fig. 2, the coupling 25 comprises an annular member 26 having diametrically opposite radial holes 27, 28, 29 and 30. The screw member 31 is fastened in the hole 27 by a suitable screw fastening and has projecting therefrom a coupling pin 32 which passes through registering holes in the sleeve 23 and motor shaft 24 and terminates in hole 29. Screw members 33 and 34 are secured in holes 28 and 30 by suitable screw fastenings and have projecting therefrom pins 35 and 36 which project inwardly into holes 37 and 38 in the sleeve 23. Suitable lock washers 39 may be provided to maintain the screws 31, 33 and 34 in position.

Attached to the plate member 20 by suitable screws 40 is a shaft seal assembly comprising an annular plate 41 having secured to its inner periphery an expansible bellows 42 which surrounds a portion of the sleeve 23 and carries at its outer end a thrust collar 44. The collar 44 is forced by a spring 43 into engagement with a thrust ring 45 carried in a groove in the impeller 13 and forms therewith a shaft seal. Preferably, the thrust ring 45 is backed by resilient material 46 such as rubber to assist in keeping it in proper alignment with the collar 44. The force of spring 43 which pushes the collar 44 against the thrust ring 45 causes an axial thrust on motor shaft 24 which is preferably taken up by suitable thrust bearings in the motor 14 not shown.

It will be noted that by virtue of my improved construction, if it is desired to remove the motor 14 for the purpose of inspection, repair or replacement while the pump still remains connected to the fluid system, it is only necessary to withdraw the coupling pin 32, by unscrewing member 31, and remove motor fastenings 18 and 18a. The motor may then be removed by withdrawing the motor shaft 24 from within the sleeve 23 of the impeller 13. When the coupling pin 32 is removed the force of the spring 43 causes the impeller to move in an axial direction until it engages a stop 47 on the pump casing. However, the seal between the collar 44 and the ring 45 is maintained so that no fluid can leak outside the pump casing.

If it is now desired to remove the shaft seal assembly, the members 33 and 34 are unscrewed from coupling 25 removing pins 36 and 37 and permitting annular member 26 to be slid off the sleeve 23. If now the fastening screws 40 are removed, the annular plate 41 may be slipped off the end of the impeller sleeve 23 carrying with it the shaft seal assembly comprising the bellows 42, the collar 44, and the spring 43. When the shaft seal assembly is withdrawn, the force of the spring 43, normally pushing the impeller in a direction away from the plate 20, is removed and the impeller 13 then moves in an axial direction towards the plate 20 due to the force of the fluid pressure in pump 10 which may still be left connected to a fluid circulating system. This axial movement of the impeller closes the space 46 and provides a second seal which prevents the flow of fluid from the pump chamber through the aperture 19a. This permits the shaft seal assembly to be removed for inspection and repair without any appreciable loss of fluid from the pump such as would necessitate the draining of the entire connected fluid system or the provision of shut-off valves in line on both sides of the pump. The feature of having the impeller movable axially to provide a second fluid seal is disclosed and claimed in an application Serial No. 355,777 of Walter O. Lum filed September 7, 1940, which is now Patent 2,268,218, dated December 30, 1941, and which is assigned to the same assignee as this application. In cases where the fluid pressure in the pump is insufficient to move the impeller towards the plate 20 to form the second seal when the shaft seal assembly is removed, this movement can be accomplished manually by pulling on the extended end of the sleeve 24.

The pump and motor may then be reassembled by reversing the operations previously described. The re-engagement of the impeller sleeve and motor shaft, after the insertion of the shaft seal assembly, is accomplished by using the coupling 25 to pull the impeller towards the plate 20 until the proper alignment of holes is secured for the coupling pin 32, the coupling 25 being held to the sleeve 23 by the pins 35 and 36.

It should also be noted that when it is desired to remove the impeller it is only necessary to remove the fastenings 21. The entire assembly including the motor, motor support, impeller and shaft seal may be removed, the opening 19 in the pump casing being of sufficient diameter to permit insertion and removal of the impeller. Of course when this is done the fluid in the connected system must be drained or otherwise shut off from the pump.

In some instances it is desirable to make the member 26 of the coupling member 25 of flexible material, such as rubber, so as to provide a flexible coupling between the motor and the impeller. In such a case it is necessary to provide enlarged holes in the sleeve 23 through which the coupling pin 32 extends so that relative rotary movement is permitted between the sleeve 23 and the shaft 24. This arrangement is shown at Fig. 3 of the drawing. The annular member 26' is formed of flexible material such as rubber and the sleeve 23 is provided with enlarged holes 50 and 51, the coupling being otherwise the same as shown in Fig. 2. The enlarged holes 50 and 51 permit relative rotary movement between the shaft 24 and the sleeve 23 whereby motor drive torque is transmitted to the flexible member 26'. The flexible coupling has the advantage that it absorbs the torque oscillations of the motor that are otherwise transmitted to the impeller and also reduces noise. This arrangement also has the advantage that the motor shaft is prevented from sticking inside the impeller sleeve because of the continuous oscillating movement between the sleeve and the shaft during operation of the pump. This arrangement has the still further advantage that it absorbs the torque pulsations of the motor while, at the same time, the axial alignment of the impeller and motor shaft, and consequently the alignment of the bearing surfaces of the seal, is properly maintained. This is due to the fact that the flexible coupling permits only a relative rotative movement between the impeller and the motor shaft, axial movement therebetween being prevented by the telescoping coupling.

Thus it is seen that I have provided an improved motor driven pump unit which is greatly simplified in construction due to the elimination of the impeller shaft and bearings. Also, it should be noted that in the case some fluid leaks by the shaft seal, it will be flung away from the rotating coupling member 25 by centrifugal action which prevents the fluid from coming into contact with and corroding the shaft 24. Thus the coupling 25 also acts as a fluid slinger and the addition of a separate member to accomplish this function is unnecessary. Corrosion of the motor shaft 24 is also further prevented due to the fact that the motor shaft is carried inside of the impeller hub where it is completely protected. Furthermore, it should be noted that since the motor support and plate member 20 are rigidly secured together, the motor and impeller with its seal ring 45 are maintained in fixed alignment with the stationary thrust collar 44 carried by the plate 20 whereby the life and effectiveness of the seal are greatly increased. Also, the fact that the motor and shaft seal can be conveniently replaced without disturbing the fluid system to which the pump is attached is obviously a great advantage.

While I have shown and described a particular embodiment of my invention, it will become apparent to those skilled in the art that my invention has other applications and that changes and modifications may be made without departing from the spirit and scope of my invention. I therefore aim in the appended claim to cover all such modifications and changes.

What I claim as new and desire to secure by Letters Patent of the United States is:

Apparatus of the character described comprising in combination a fluid casing having an aperture therein, an impeller in said casing having a hollow hub extending through said aperture, a rotary seal for preventing leakage of fluid from said casing outwardly along said hub, said seal comprising cooperating relatively movable bearing surfaces which depend for proper operation on a predetermined axial alignment of said hub relative to said casing, a motor having a pulsating torque, said motor being rigidly secured to said casing and having a projecting shaft on which said hub is slidably mounted in telescoping relation, and a resilient member interconnecting said hub and said shaft, said resilient member being arranged to yield and permit a limited relative rotating movement between said hub and said shaft whereby a coupling is provided which absorbs the torque pulsations of said motor thereby preventing their transmission to said impeller and yet maintains said hub in accurate axial alignment with said shaft and said casing thus insuring proper operation of said seal.

MANUEL G. ROBINSON.